United States Patent [19]
Lentz

[11] Patent Number: 5,886,705
[45] Date of Patent: *Mar. 23, 1999

[54] TEXTURE MEMORY ORGANIZATION BASED ON DATA LOCALITY

[75] Inventor: Derek J. Lentz, San Jose, Calif.

[73] Assignee: Seiko Epson Corporation, Tokoyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 650,010

[22] Filed: May 17, 1996

[51] Int. Cl.$^6$ ................................. G06T 15/00
[52] U.S. Cl. ............................. 345/430
[58] Field of Search ................... 395/126–133; 345/426–433

[56] References Cited

U.S. PATENT DOCUMENTS

| | | |
|---|---|---|
| 4,615,013 | 9/1986 | Yan et al. ............................ 345/430 |
| 4,692,880 | 9/1987 | Merz et al. ........................... 358/104 |
| 4,823,286 | 4/1989 | Lumelsky et al. .................... 345/432 |
| 4,931,954 | 6/1990 | Honda et al. ......................... 345/428 |
| 4,935,879 | 6/1990 | Ueda .................................. 345/430 |
| 4,945,495 | 7/1990 | Ueda .................................. 345/430 |
| 5,003,496 | 3/1991 | Hunt, Jr. et al. ..................... 345/430 |
| 5,179,638 | 1/1993 | Dawson et al. ....................... 345/425 |
| 5,222,205 | 6/1993 | Larson et al. ........................ 345/430 |
| 5,408,251 | 4/1995 | Kwon ................................. 345/515 |
| 5,548,709 | 8/1996 | Hannah et al. ....................... 355/117 |

*Primary Examiner*—Almis R. Jankus
*Attorney, Agent, or Firm*—Michael T. Gabrik

[57] ABSTRACT

A graphics-system texture memory (21) contains a plurality of texture maps, each of which represents a common texture image with a different spatial resolution. A given map's data that represent one region (66) in a texture space (58) is contained in a memory block (Block__0) that holds other maps' data for the same region, while a separate block (Block__1) contains that map's data representing a different region (74). This organization reduces the occurrence of memory-page changes during the computation of a display-pixel value.

11 Claims, 5 Drawing Sheets

TEXTURE MEMORY ORGANIZATION BASED ON DATA LOCALITY

BACKGROUND OF THE INVENTION

The present invention is directed to texture mapping in computer graphics. It specifically concerns the manner in which a texture image is stored for use in texture mapping.

A situation commonly encountered in computer graphics is the need to render an image of an object whose surface has a detailed pattern. The surface's image is computed from digital samples of the pattern itself. That stored pattern image is known as a texture map.

Despite the name, a texture map is not limited to perturbations in surface normals; for instance, the "texture" image that it represents can be a color pattern, such as a plaid pattern in two-space, that "wallpapers" the surface of an object whose image is being computed.

FIG. 1 depicts in simplified form a typical system 10 for generating images of objects that have been defined by any of the many types of object descriptions ordinarily employed for this purpose. For example, in FIG. 2's object surface 11 may be represented as, say, a plurality of bicubic patches defined by parametric equations. That is, one way to define a surface segment is to use three-space parametric equations such as:

$$x = (a_{x3}s^3 + a_{x2}s^2 + a_{x1}s + a_{x0})(b_{x3}t^3 + b_{x2}t^2 + b_{x1}t + b_{x0})$$

$$y = (a_{y3}s^3 + a_{y2}s^2 + a_{y1}s + a_{y0})(b_{y3}t^3 + b_{y2}t^2 + b_{y1}t + b_{y0})$$

$$z = (a_{z3}s^3 + a_{z2}s^2 + a_{z1}s + a_{z0})(b_{z3}t^3 + b_{z2}t^2 + b_{z1}t + b_{z0}),$$

where (x, y, z) is a location in three space, s and t are parameters that range, say, from 0 to 1 for all patches, and the a's and the b's are the stored coefficients that form the patch description. Of course, this is only one of the many object-description methods known to those skilled in the art.

To render the image, a scan-conversion process 12 in FIG. 1's output-image generator 13 converts this description into corresponding scan locations addressed by a picture-element ("pixel")-address calculator 14, and a pixel-value calculator 15 computes each pixel value drawn by a display system 16's display circuitry 17 to drive its display device 18, such as a computer monitor or printer. The scan-conversion process typically treats the display pixel as a small rectangle 19 (FIG. 2) in an object-space display plane, and it projects that rectangle onto the surface 11. This gives the location on the surface but not, say, its color. The pixel-value calculator 15 obtains the color from a texture image with which process 12 has "papered" the surface, mapping the surface into a is (typically but not necessarily two-dimensional) texture space 20.

Data in a texture memory 21 (FIG. 1) represent the texture image as values of texture elements ("texels") thereof just as the pixel-value calculator 15 represents the displayed image as values of output-image pixels. The texel values can be thought of as samples from a texture image that is continuous in, say, a two-dimensional (u, v) texture space. The mapping of the output pixel 19's projection 22 into the texture space defines an area 23 that may encompass a number of texels. If so, all of those texels' values need to be taken into account in order to produce an accurate pixel value. To compute the pixel value, the pixel-value calculator 15 may simply average all of those texel values, possibly after weighting some in accordance with the fraction of the associated texel that falls within the area 23. In other cases, more-complicated filtering may be employed. In any event, pixel-value computation requires that those texel values be located and fetched from the texture memory 20. This is the function of a texture-address-calculation circuit 24, which will be described presently.

Now, the need to fetch a plurality of texel values for each pixel-value computation can become onerous, as FIG. 3 illustrates. FIG. 3 depicts the object space and includes an edge view of the image plane 32. Tick marks 34 represent assumed pixel boundaries, and an eye 36 represents the viewpoint in accordance with which the object image is to be determined.

We assume that the texture image is to cover two planar surfaces 38 and 40. The projection of one pixel onto plane 38 is shown to cover approximately 4×4=16 texels. Fetching this many values for a single pixel is onerous enough, but plane 40 shows that the problem can become considerably worse.

To reduce this problem, the texture memory may store a texture image as a plurality of texture maps, each of which represents the texture image with a different resolution. A base pixel map represents the texture image as values of a large number of small texels. Pre-filtering the base texture map produces texture maps that express the texture image as the values of increasingly small numbers of increasingly large texels. Typically, although not necessarily, each successive texture map of a set consists of the values of texels whose linear dimensions are half those of the previous texture map's texels. These pre-filtered maps are often referred to as "mip maps." When the output-image generator 13 then requests texture data for use in calculating a given pixel value, it does so by way of an ordered triple (u, v, d), where u and v are spatial coordinates in the texture space and d is an indication of the spatial resolution with which the data should be represented. Generator 13 typically expresses u and v with sub-texel resolution. Similarly, it computes the quantity d as a continuous function of, say, the partial derivatives of the texture-space coordinates with respect to the display-space coordinates, and the result typically falls between d values that correspond to respective maps. From these values, the texture-address-calculation circuit 24 determines which texture maps and constituent locations contain the needed texel data.

Texels of more than one resolution may be required for a single pixel-value computation, so it is important that texture-memory accesses be performed rapidly even if data for a given pixel-value computation must be drawn from different maps. FIG. depicts a memory organization typically used in attempting to achieve this result. FIG. 4 treats the texture-memory address space as two-dimensional: the vertical position in FIG. 4 represents the value of certain of the address bits, and horizontal position in that drawing represents the value of the remainder. If the texture maps are stored in DRAM devices, for example, the vertical and horizontal positions may respectively represent the values of the row and column addresses sequentially applied to those devices.

The memory's largest segment 42, whose row- and column-address values are both at least twice those in any other segment, contains the base, finest-spatial-resolution texture map. FIG. 4 depicts the upper left corner of that segment as corresponding to the (u, v) origin, with u and v increasing with increasing column and row addresses, respectively. This map corresponds to, say, d=0. Another segment 44 represents the same image with the same range in (u, v), but the spatial sampling resolution is coarser by a factor of 2. This map may correspond to d=1. Segments 46 and 48 are successively coarser texture maps which may respectively correspond to d=2 and d=3. A final segment 50 is conventionally left empty.

This organization is more typically depicted as in FIG. 5, which shows its use for the three sets of texture maps required for a color texture image: segment 51 contains the highest-spatial-resolution red-component texel information, segment 52 contains highest-spatial-resolution green-component information, and segment 54 contains the highest-spatial-resolution blue texel information.

The memory organization of FIGS. 4 and 5 is considered advantageous for multiple-resolution texel-data retrieval because addresses for texel data in different maps corresponding to the same locations in texture space are simply shifted versions of one another. If segment 42 is an (atypically small) 8×8-location memory segment, for instance, then its lower-right location's binary address is (0111, 1111), while segment 42's lower-right location's address is (0011, 01 11), and that of segment 46 is (0001, 0011).

SUMMARY OF THE INVENTION

However, I have devised an arrangement that maximizes texel-data-retrieval speed more effectively, by emphasizing the retrieval-speed advantages of data locality. In accordance with my invention, the texture space is divided into a plurality of regions, the texture memory is divided into a plurality of corresponding memory blocks, and a single memory block contains all of the different-spatial-resolution texture maps' texel data representing the same, corresponding texture region. Although the resultant address computation is more complicated than, for instance, that of the mip-map organization described above, my approach can yield greater speeds, since it minimizes the occurrence of memory-page changes, which I have recognized are a greater obstacle to high-speed texture-data removal than address computation is.

BRIEF DESCRIPTION OF THE DRAWINGS

The following invention discussion refers to the accompanying drawings, of which.

DETAILED DESCRIPTION OF AN ILLUSTRATIVE EMBODIMENT

Figure 1:
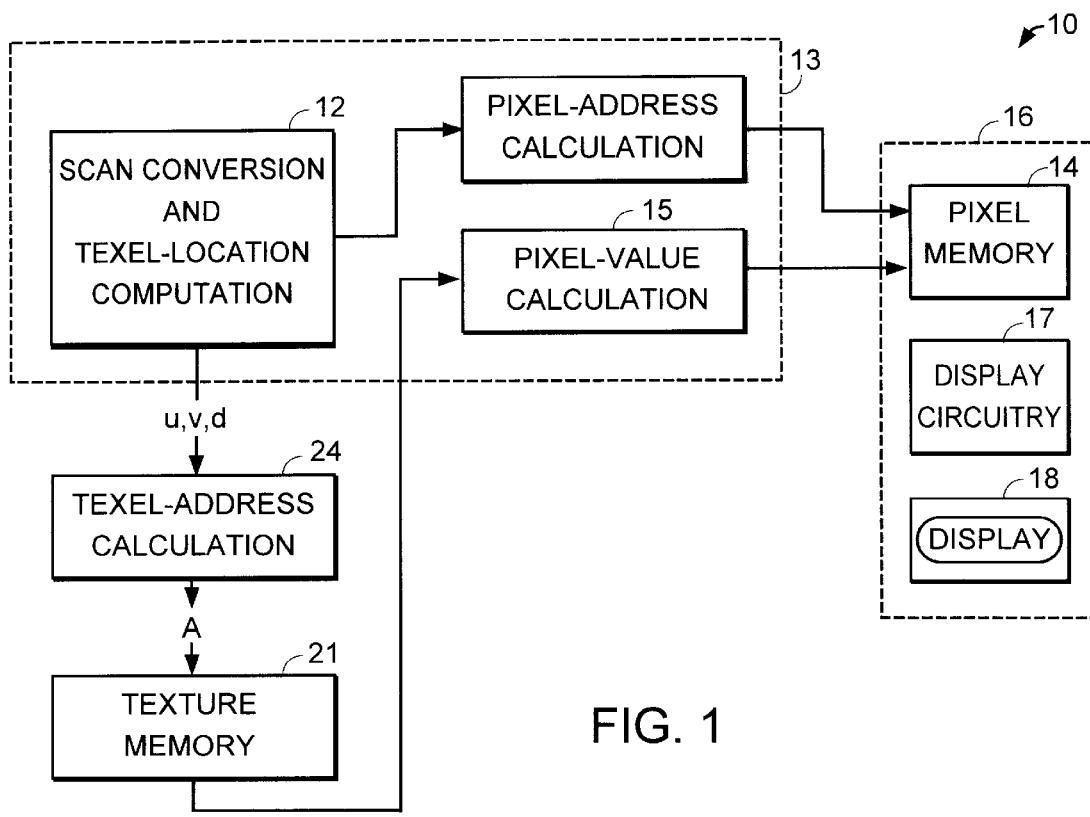
FIG. 1, described above, is a block diagram of a computer-graphics system that employs texture mapping.
Figure 2:
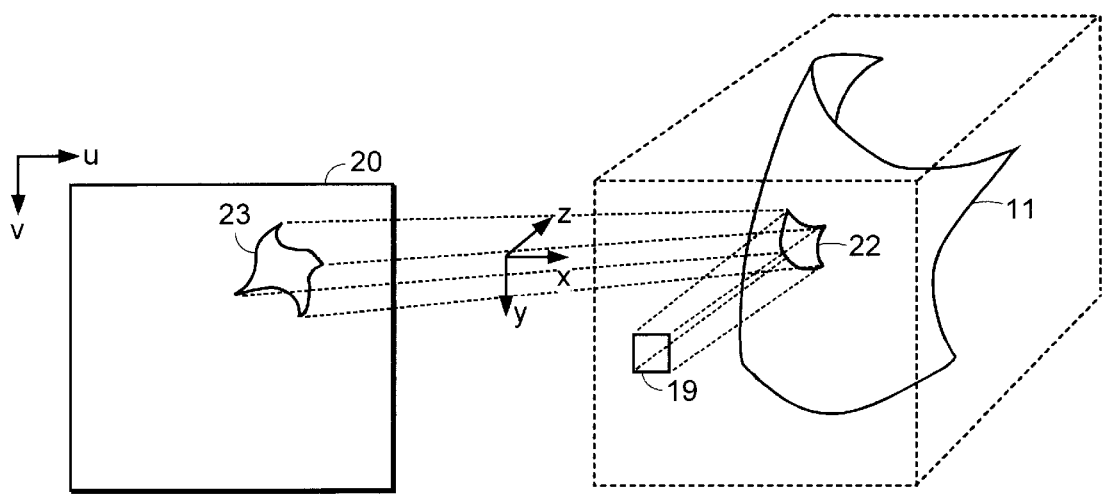
FIG. 2, described above, is a diagram illustrating the relationships among the object-space output-image plane, the object surface, and the texture space employed in a texture-mapping system.

A graphics system that employs the present invention's teachings is typically organized as described above in connection with FIG. 1. That is, some circuitry 13 for computing texel and pixel addresses and pixel values applies image signals representing those values to some type of display system 16. In computing those pixel values, the output-image generating circuitry 13 requests texel data corresponding to locations (u, v) in a texture-image space, and the request includes a parameter d, which is indicative of the relative spatial resolution that circuitry 13 requires of the requested texel data. The output-image-generation circuitry may be embodied in an appropriately programmed general-purpose machine, such as is used in a personal computer, although I prefer to employ one of the types of dedicated graphics circuitry optimized for this function.

Similarly, the texture-address-calculation circuitry 24, which converts the texture-space and resolution information to texture-memory addresses, can be embodied by appropriate programming in the same general-purpose machine. Typically, the computer will obtain the necessary instructions from a computer disk or similar storage device, and the texture memory 21 can be embodied in the computer's general-purpose memory circuitry or in an undisplayed portion of the pixel memory. But if the application admits of the expense, it is preferable to employ dedicated graphics circuitry for these functions, as is common in the prior art.

Figure 6:
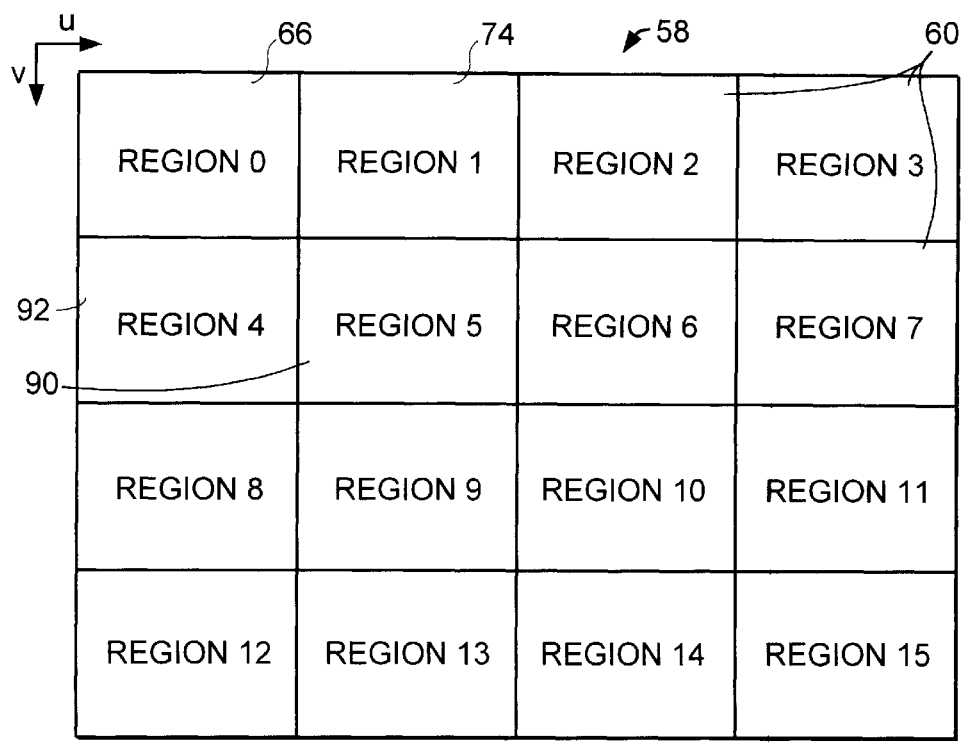
FIG. 6 is a block diagram depicting the division of a texture space into texture-space regions for the purposes of the present invention.

An apparatus that employs the present invention's teachings differs from such prior-art arrangements in that it has a texture-memory organization based on a division of the texture-image space into regions, as FIG. 6 illustrates. FIG. 6's texture space 58 consists of a plurality of regions 60, which correspond to respective memory blocks, as will be explained presently. FIG. 6 depicts the regions 60 as being rectangular and of equal size. This feature is convenient but not necessary; the broader teachings of the present is invention can be employed with regions of any shape.

Just as in prior-art systems, the present invention's texture memory contains a plurality of maps, each of which represents the entire texture space 58 in values of texels whose size differs from those of other maps'. But embodiments of the present invention store different regions' data in different memory blocks.

Figure 7:
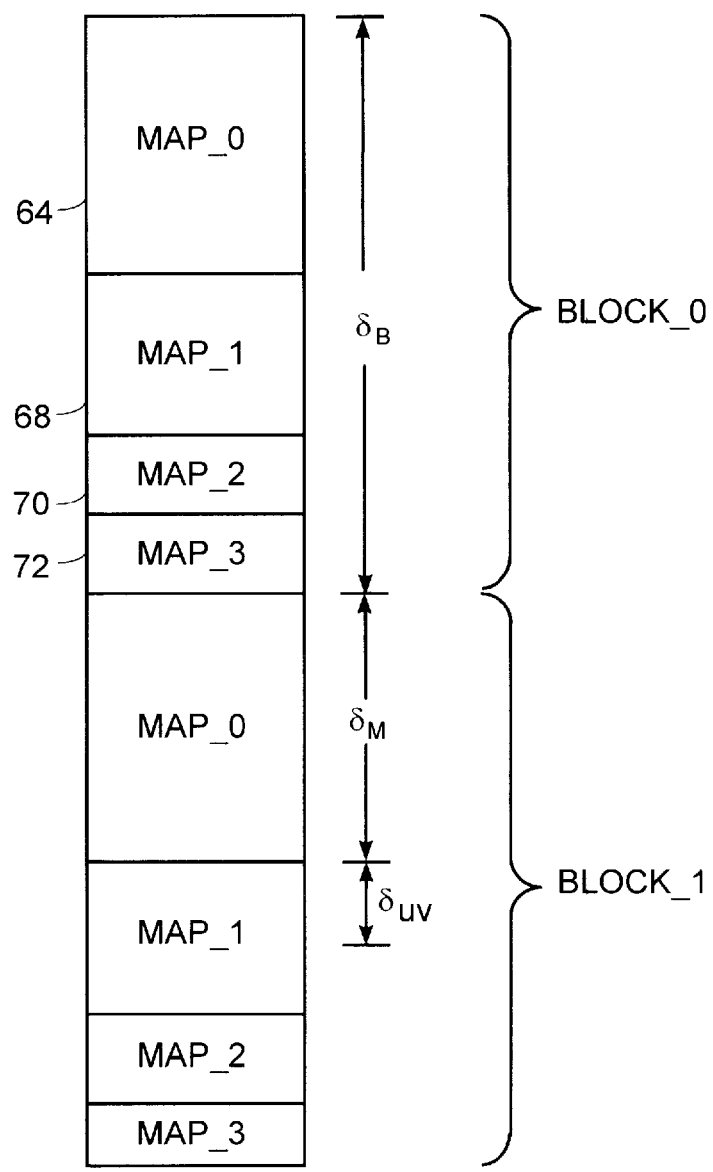
FIG. 7 is a diagram of a texel-map region whose memory organization follows the teachings of the present invention.

FIG. 7 illustrates this organization. Block__0 represents consecutively addressed texture-memory locations. Although FIG. 7 depicts Block__0 as extending vertically for typographical reasons, successive addresses will typically designate what are ordinarily referred to as successive column addresses in the physical random-access-memory device that at some point will contain the texture map 20. Block__0 contains all texture maps' data that represent FIG. 6's region 66. One segment 64 of Block__0 represents the texel data from the highest-resolution texture map, Map__0. Segment 64 does not contain all of the Map__0 texel data, but it does contain all of Map__0's texel data that represents a sampling of FIG. 6's region 66.

Another Block__0 segment 68 also contains data representing FIG. 6's region 66. But its data come from a coarser-resolution map, Map__1, so FIG. 7 depicts it as occupying less memory space than segment 64 does. Successively smaller Block__0 segments 70 and 72 contain data for the same region from successively coarser-resolution texture maps.

FIG. 7 depicts a further memory block, Block$_{-1}$, as being similarly organized. Its data represent FIG. 6's next region 74. Although FIG. 7 shows Block__1 as being contiguous to segment 72, this is not necessary. Indeed, it will be preferable in many cases to leave extra space so as to prevent a block from bridging memory pages.

Now, this organization appears more complicated than the mip-map organization described above in connection with FIGS. 4 and 5, and its memory-address computation is indeed more complicated in most embodiments. But I have recognized that it can actually achieve performance superior to that of conventional texture-map organizations.

Figure 3:
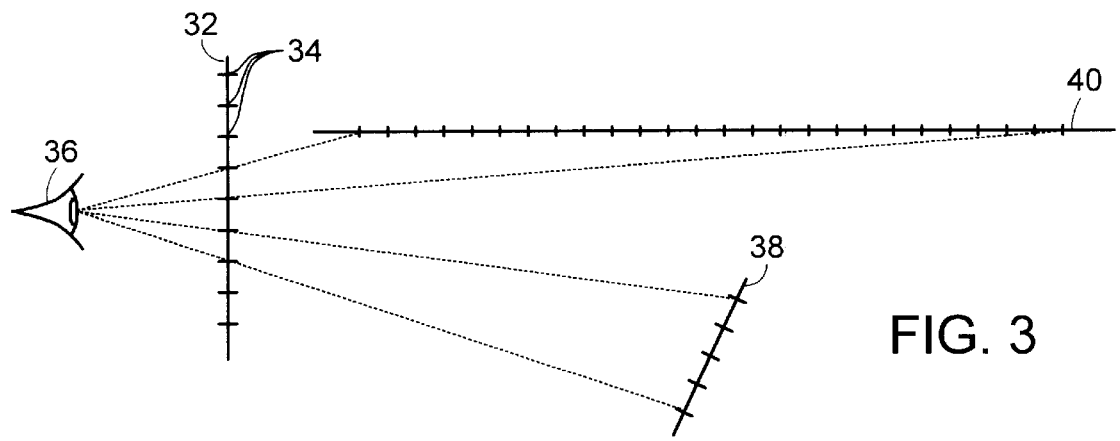
FIG. 3, described above, is a diagram illustrating that computation of a single output pixel value can require data from a large number of base-texture-map texels.

Part of the reason for this arises from the paging employed in the management of most dynamic random-access memory devices. In the typical DRAM used for texture-map memories, the address is applied to the memory device in two parts, a row address and a column address. Except when the end of an address row is reached, successive addresses have the same row address but successive column addresses. Because of this arrangement, accessing a sequence of consecutively addressed locations is typically a relatively fast operation: only the column address needs to be changed, and the change takes little time because the DRAM's sense-amplifier/latch circuitry typically holds the data, so they can be used quickly. With all the necessary overhead, on the other hand, changing a row address can take on the order of 80–150 nanoseconds extra Now consider the operation of fetching the texel data used for computing a given pixel value. As was explained above in connection with FIG. 3's plane 40, a single output pixel may project onto a texture-space area that spans a large number of texels. Moreover, one output-pixel edge may project to a texture-space line that traverses a relatively few texels in the base, finest-resolution texture map, while the opposite edge of that output-image pixel may project to a line that traverses a large number of those finest-resolution texels. So although the texture-space points designated by successive texture-request signals that FIG. 1's output-image-generation circuitry 13 sends to obtain data for computing a single output pixel tend to fall in the same texture-space region, their data would be requested from different maps.

Figure 4:
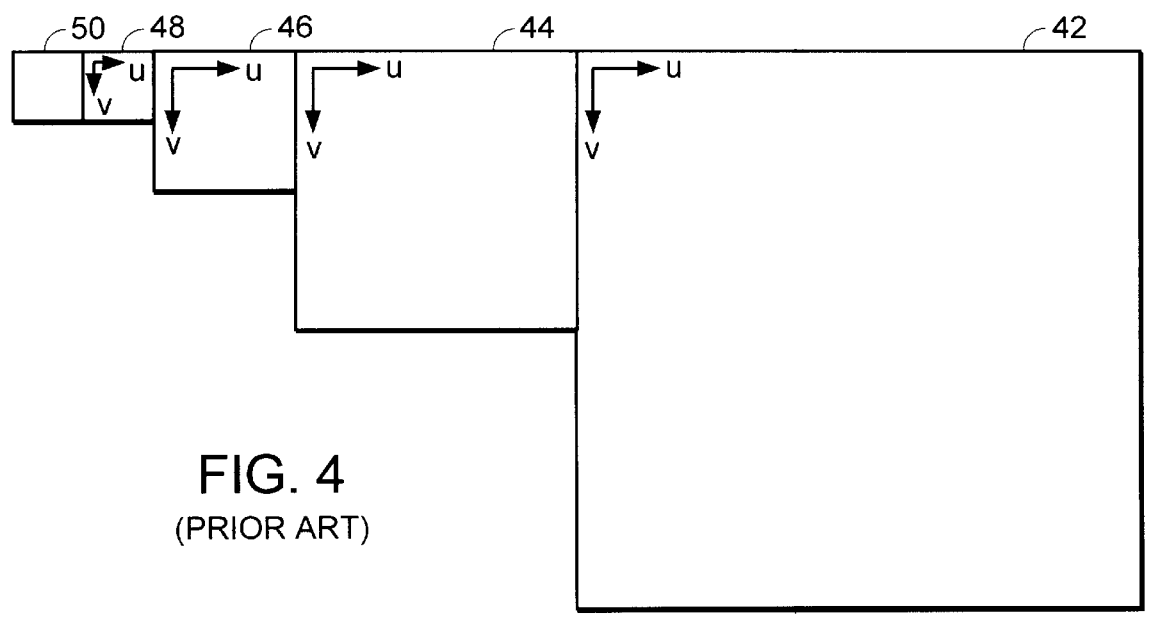
FIG. 4, described above, is a diagram that illustrates a conventional mip-map organization.
Figure 5:
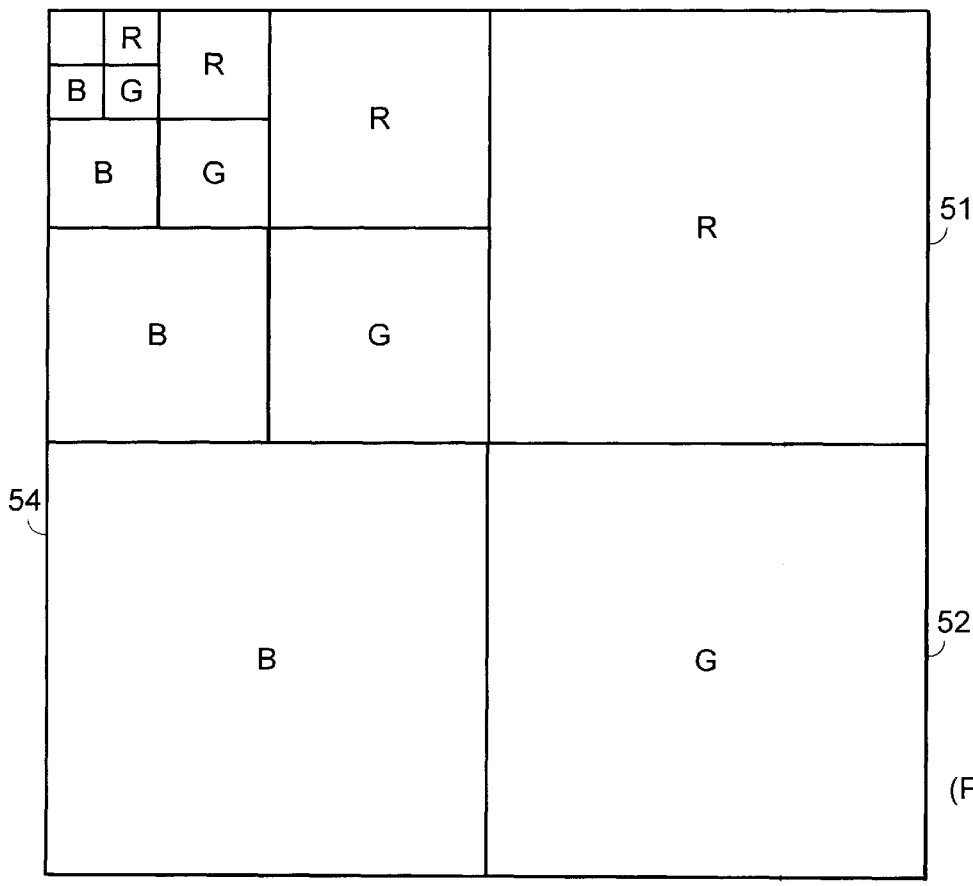
FIG. 5, described above, is a diagram depicting mip-map use for color texel data.

In a conventional memory organization such as that depicted in FIG. 4, this would most often result in memory locations on different "pages," i.e., in locations whose row addresses differ. And since the page change could potentially occur more than once for each of a large number of successive output pixels, the attendant speed loss would be considerable. Conventional graphics systems can avoid this loss only by resorting to expensive static random-access memories (SRAMs), which typically accept column and row addresses in parallel.

But since embodiments of the present invention store a region's texel data of all resolutions in the same block, a single page can hold all of those data if the block size is appropriately chosen. So fetching multiple-resolution texel data for a given pixel is much less likely to involve page changes and the attendant long-duration fetch operations.

Figure 8:
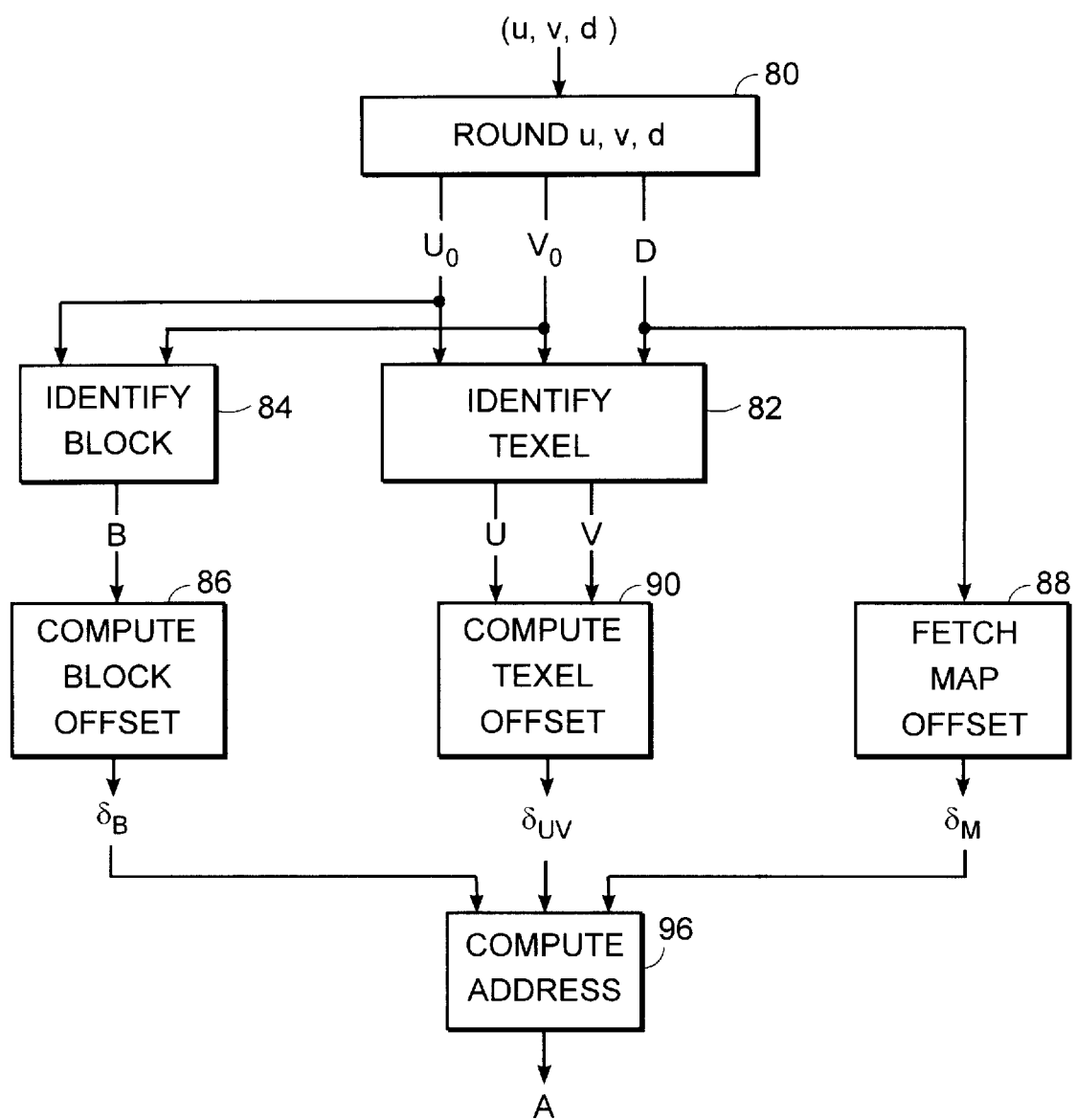
FIG. 8 is a diagram depicting the address computation employed in one embodiment of the present invention.

FIG. 8 depicts the manner in which addresses can be determined for one particular embodiment of the present invention. We assume a base, finest-spatial-resolution Map_0 in which pixels are designated by integer pairs ($U_0$, $V_0$), where the value of the ($U_0$, $V_0$) texel is considered to be a sample of the texture-image space taken at $u=U_0$, $v=V_0$. We also assume that pixel (U, V) in $Map_n$ is considered to be a sample of the texture-space image taken at $(u, v)=(2^n U, 2^n V)$.

FIG. 8's block 80 represents rounding (u, v) to obtain the identity of the corresponding Map_0 texel ($U_0$, $V_0$). It is typical the resolution d in the texel request to be expressed as a rational number, and in some systems the pixel-value computation involves employing data from the two texture maps corresponding to the integer values that bracket d. But we will assume for purposes of explanation that the resolution d is simply rounded to an integer in order to specify a single map, and block 80 further represents this rounding to obtain an integer-valued map indicator D. Also for the purposes of explanation, we will assume that the system simply requires the value corresponding to the closest sample location in the requested map, although those skilled in the art will recognize that some systems will instead respond to such a specification by fetching the samples that bracket the specified location. The resultant D value identifies the map from which the texel data are to be drawn.

Block 82 represents identifying the required texel (U, V) in that map. The nature of this operation depends on the maps' internal organizations in the particular embodiment. In the illustrated embodiment the texel's identity is obtained by scaling the base-map texel-identifier components $U_O$ and $V_O$ in accordance with that map's resolution, i.e., by simply right-shifting the binary representations of $U_O$ and $V_O$ by D positions and rounding.

Determining the memory location is then a matter of computing an address A in accordance with quantities that FIG. 7 depicts. As FIG. 7 shows, the address for, say, one of the Map_1 texels is the sum of a block offset $\delta_B$, a map offset $\delta_M$, which specifies the offset of the desired map within the specified block, and a texel offset $\delta_{UV}$, which indicates the offset within the chosen map's segment in that block.

To obtain the block offset, it is first necessary to identify the block involved, which is equivalent to identifying the region in texture-image space in which the specified location lies. FIG. 8's block 84 represents determining the block number B in accordance with:

$$B = int\left(\frac{V_0}{V_{B0}}\right)B_U + int\left(\frac{U_0}{U_{B0}}\right),$$

where $V_{B0}$ is the number of rows of base-map texels in a single region, $U_{B0}$ is the number of columns of base-map texels in a single region, Bu is the number of columns of regions in the entire texture-image space, and int(x) is the part of x to the left of the decimal point. Typically, $B_U$, $U_{B0}$, and $V_{B0}$ are all chosen to be powers of two. This means that the block-identification calculation can be accomplished simply by adding the results of appropriately bit-shifting and rounding $U_0$ and $V_0$. And if $B_U=V_{B0}$, even $V_0$'s bit shifting is unnecessary.

The block offset $\delta_M$ is then readily computed in accordance with:

$$\delta_B=BS_B,$$

where $S_B$ is the size of an individual memory block. FIG. 8's block 86 represents this operation. If the block size is chosen to be a power of two, this is a simple left-shift operation.

The map offset $\delta_M$ is best determined from the map identifier D by way of a very small look-up table that has only as many locations as there are maps. Block 88 represents this table-look-up operation.

Block 90 represents determining the texel offset $\delta_{UV}$ in accordance with:

$$\delta_V=(V mod V_B)U_B S_T,$$

$$\delta_U=(U mod U_B)S_T,$$

and $$\delta_{UV}=\delta_U+\delta_V,$$

where $V_B$ is the number of rows of Map_D texels in a single region, $U_B$ is the number of columns of the chosen-resolution texels in the designated region, and $S_T$ is the number of bytes per texel. (We assume here that memory locations are addressed in terms of bytes, although the present invention does not require such an addressing mechanism.)

For the purposes of this calculation, $V_B$ and $U_B$ are both integers greater than zero even though a single coarse-resolution texel can be larger than a region; each block contains the value of every texel that its corresponding region even partially contains. This means that there typically is some data duplication among blocks. Indeed, some embodiments' memory blocks may include data for texels completely outside their respective texture-space regions. For instance, FIG. 7's memory segment 64 could additionally contain data corresponding to the texels in FIG. 6's regions 74, 90, and 92 that are contiguous to the region 66 with which segment 64 is associated.

Block 96 represents the final address computation, namely, obtaining the address A by adding up the block, map, and texel offsets:

$$A = \delta_B + \delta_M + \delta_{UV}.$$

Those skilled in the art will recognize that the graphics-system circuitry can readily be arranged to perform FIG. 8's operations in a rapid manner. In dedicated graphics circuitry, the calculations shown there can be performed in a parallel or pipelined manner, so it would be the texel-data retrieval operation itself, rather than the computation of the addresses used for that retrieval, that determines the speed at which the system obtains texel data. Clearly, storage in accordance with the present invention minimizes the time required for the actual memory accesses.

Of course, the FIG. 8 operations cannot be performed in parallel if they are implemented only in the general-purpose central-processing circuitry of most present-day personal computers, but this does not mean that the present invention's advantages do not extend to embodiments that do not employ dedicated graphics circuitry. For one thing, most of the operations can be simple shifts of register data, although operation 86 would likely be implemented by way of a main- or cache-memory access. This means that the address computation can be performed very rapidly even in embodiments that employ only the general-purpose central-processing circuitry.

Moreover, the memory locality in which the present invention tends to result yields a further level of paging advantage in such arrangements. Some computer operating systems read into the main memory only those pages of a process's data that the process has requested. Data in pages not previously requested must be fetched from back-up memory, such as a computer disk. The memory organization of the present invention greatly reduces the occurrence of such "page faults," i.e., of situations in which the required data are not in main memory and must therefore be obtained by a disk access. Since a disk-memory access requires orders of magnitude more time than a main-memory access, the delay that page-fault avoidance prevents completely dwarfs any delay from the minimal extra address computation that the present invention can necessitate.

Although the foregoing description suggests that the block sizes be small enough to be included within a single memory page, the invention yields advantages even if the blocks are not so sized and even if, when they are so sized, no effort is made to ensure that a block does not bridge memory pages. Even in those circumstances, the present invention requires page changes less frequently than conventional texture-memory organizations, since storage of a region's data of all resolutions in a common block makes it much less likely that a resolution difference will necessitate a page change.

The present invention can therefore be practiced in a wide range of embodiments and thus constitutes a significant advance in the art.

I claim:

1. An imaging system comprising:
   A) a display system for displaying, in response to application thereto of image signals representing pixel values, an image consisting of pixels whose values are those that the image signals represent;
   B) a texture memory containing a set of texture maps that represent a texture image that spans a plurality of texture-space regions, each texture map being associated with a different spatial resolution and consisting of texel data that represent, with the associated spatial resolution, all of the texture-space regions of the texture image, the texture memory comprising a plurality of memory blocks, each memory block (i) consisting of a sequence of consecutively addressable memory locations, (ii) being associated with a respective one of the texture-space regions, and (iii) containing all of each texture map's texel data that represent that texture-space region of the texture image, so that the texel data of each texture map is not all contained in one memory block but in different memory blocks, the texture memory responding to address signals applied thereto by fetching texel data from the memory locations addressed thereby;
   C) a texture-retrieval circuit for applying to the texture memory address signals that address memory locations in the same memory block in response to application to the texture-retrieval circuit of texture-request signals that specify texture-space locations in the same texture-space region with different spatial resolutions; and
   D) an output-image-computing circuit for incorporating texture information in an output image by applying to the texture-retrieval circuit texture-request signals that specify texture-space locations and spatial resolutions, computing pixel values from the texel data thereby fetched from the texture memory, and applying to the display system image signals representing the thus-computed pixel values.

2. An imaging system as defined in claim 1 wherein the address signals that the texture-retrieval circuit applies to the texture memory represent addresses that the texture-retrieval circuit computes as a sum of a block offset, a map offset, and a texel offset.

3. An imaging system as defined in claim 2 wherein the texture-retrieval circuit determines the block offset from the texture-space location that the texture-request signals specify.

4. An imaging system as defined in claim 3 wherein the texture-retrieval circuit determines the map offset from the spatial resolution that the texture-request signals specify.

5. An imaging system as defined in claim 2 wherein the texture-retrieval circuit determines the map offset from the spatial resolution that the texture-request signals specify.

6. A storage medium containing instructions, readable by a computer that includes a memory circuit responsive to address signals applied thereto to fetch texel data from a thereby-addressed memory location within one of a plurality of memory blocks consisting of respective sequences of consecutively addressable memory locations that the memory circuit comprises, that configure the computer to:

A) form a set of texture maps that represent the same texture image, which texture image spans a plurality of texture-space regions associated with respective different ones of the memory blocks, by providing a base texture map consisting of texel data that represent all of the texture-space regions of the texture image with a base spatial resolution and computing from the base texture map at least one other texture map consisting of texel data that represent all of the texture-space regions of the texture image with a spatial resolution coarser than the base spatial resolution;

B) store in each memory block all of each texture map's texel data that represent the part of the texture image in the texture-space region associated with that block so that the texel data of each texture man is not all contained in one memory block but in different memory blocks;

C) function as a texture-retrieval circuit for applying to the memory circuit address signals that address memory locations in the same memory block in response to application to the texture-retrieval circuit of texture-request signals that specify texture-space locations in the same texture-space region with different spatial resolutions; and D) function as an output-image-computing circuit for incorporating texture information in an output image by applying to the texture-retrieval circuit texture-request signals that specify texture-space locations and spatial resolutions, computing pixel values from the texel data thereby fetched from the memory circuit and applying image signals representing the thus-computed pixel values to a display system for displaying an image that consists of pixels whose values are those that the image signals represent.

7. A storage medium as defined in claim 6 wherein the address signals that the texture-retrieval circuit applies to the memory circuit represent addresses that the texture-retrieval circuit computes as a sum of a block offset, a map offset, and a texel offset.

8. A storage medium as defined in claim 7 wherein the texture-retrieval circuit determines the block offset from the texture-space location that the texture-request signals specify.

9. A storage medium as defined in claim 8 wherein the texture-retrieval circuit determines the map offset from the spatial resolution that the texture-request signals specify.

10. A storage medium as defined in claim 7 wherein the texture-retrieval circuit determines the map offset from the spatial resolution that the texture-request signals specify.

11. For creating a texture memory, a method comprising:

A) providing a memory circuit comprising a plurality of memory blocks, each memory block consisting of a sequence of consecutively addressable memory locations;

B) forming a set of texture maps that represent the same texture image, which texture image spans a plurality of texture-space regions associated with respective different ones of the memory blocks, by providing a base texture map consisting of texel data that represent all of the texture-space regions of the texture image with a base spatial resolution and computing from the base texture map at least one other texture map consisting of texel data that represent all of the texture-space regions of the texture image with a spatial resolution coarser than the base spatial resolution; and C) storing in each memory block all of each texture map's texel data that represent the part of the texture image in the texture-space region associated with that block so that the texel data of each texture map is not all contained in one memory block but in different memory blocks.

* * * * *

UNITED STATES PATENT AND TRADEMARK OFFICE
CERTIFICATE OF CORRECTION

PATENT NO. : 5,886,705
DATED : March 23, 1999
INVENTOR(S) : Derek Lentz

It is certified that error appears in the above-identified patent and that said Letters Patent is hereby corrected as shown below:

Title page, item 73, Assignee, change "Tokoyo" to --Tokyo--.

Signed and Sealed this

Third Day of August, 1999

Q. TODD DICKINSON

*Attest:*

*Attesting Officer*    Acting Commissioner of Patents and Trademarks